(12) United States Patent
Sundaresan (10) Patent No.: US 9,767,260 B2
(45) Date of Patent: Sep. 19, 2017

(54) MANAGING SUPPLEMENTAL CONTENT RELATED TO A DIGITAL GOOD

(71) Applicant: eBay Inc., San Jose, CA (US)

(72) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 301 days.

(21) Appl. No.: 14/182,232

(22) Filed: Feb. 17, 2014

(65) Prior Publication Data

US 2015/0235013 A1  Aug. 20, 2015

(51) Int. Cl.
*G06Q 10/00* (2012.01)
*G06F 21/10* (2013.01)
*G06Q 30/02* (2012.01)
*G06Q 20/12* (2012.01)

(52) U.S. Cl.
CPC ......... *G06F 21/10* (2013.01); *G06Q 20/1235* (2013.01); *G06Q 30/0206* (2013.01); *G06F 2221/0777* (2013.01)

(58) Field of Classification Search
USPC .............................................. 705/7.11–7.42
See application file for complete search history.

(56) References Cited

U.S. PATENT DOCUMENTS

| | | | |
|---|---|---|---|
| 8,150,757 B1 | 4/2012 | Sieffert et al. | |
| 8,364,595 B1 | 1/2013 | Ringewald | |
| 2003/0177076 A1 | 9/2003 | Might et al. | |
| 2009/0210709 A1 | 8/2009 | Fujiwara | |
| 2011/0302009 A1 | 12/2011 | Freed et al. | |
| 2012/0030022 A1 | 2/2012 | Ajima | |
| 2012/0059730 A1 | 3/2012 | Jensen | |
| 2012/0059732 A1 | 3/2012 | Dakka et al. | |
| 2013/0054399 A1 | 2/2013 | Ben-Yaacov et al. | |
| 2013/0060615 A1* | 3/2013 | Block ................ | G06Q 30/0601 705/14.11 |

(Continued)

OTHER PUBLICATIONS

ContentGuard Launches eBook Practice for Online Bookstores and Publishers Microsoft Selects ContentGuard as Preferred eBook Consulting Practice . . . The Free Library. 2000 Business Wire May. 13, 2017 https://www.thefreelibrary.com/ContentGuard+Launches+eBook+Practice+for+Online+Bookstores+and...-a064991484.*

(Continued)

*Primary Examiner* — Amber A Misiaszek
(74) *Attorney, Agent, or Firm* — Schwegman Lundberg & Woessner, P.A.

(57) ABSTRACT

In various example embodiments, a system and method for managing supplemental content relating to a digital good are presented. The supplemental content relating to the digital good may be received, where the supplemental content may be for presentation to a consumer. The supplemental content may be stored in accompaniment with the digital good. Ownership criteria associated with ownership rights of the supplemental content may be determined. The ownership rights corresponding to the supplemental content may be transferred from a first entity to a second entity based, at least in part, on the determined ownership criteria. The second entity may be authorized to access the supplemental content based, at least in part, on the determined ownership criteria. The supplemental content may be caused to be distributed to the second entity.

12 Claims, 8 Drawing Sheets

(56) References Cited

U.S. PATENT DOCUMENTS

2013/0097028 A1    4/2013  Han et al.
2013/0211954 A1    8/2013  Linden et al.
2013/0254284 A1*   9/2013  Dougherty .............. G06F 21/00
                                                       709/204
2015/0356531 A1   12/2015  Sundaresan et al.

OTHER PUBLICATIONS

"U.S. Appl. No. 14/301,266, Examiner Interview Summary mailed Aug. 19, 2015", 4 pgs.
"U.S. Appl. No. 14/301,266, Final Office Action mailed Nov. 16, 2015", 21 pgs.
"U.S. Appl. No. 14/301,266, Non Final Office Action mailed Jun. 2, 2015", 19 pgs.
"U.S. Appl. No. 14/301,266, Response filed Mar. 11, 2016 to Final Office Action mailed Nov. 16, 2015", 13 pgs.
"U.S. Appl. No. 14/301,266, Response filed Aug. 25, 2015 to Non Final Office Action mailed Jun. 2, 2015", 17 pgs.
"U.S. Appl. No. 14/301,266, Non Final Office Action mailed Jul. 13, 2016", 24 pgs.

* cited by examiner

MANAGING SUPPLEMENTAL CONTENT RELATED TO A DIGITAL GOOD

TECHNICAL FIELD

Embodiments of the present disclosure relate generally to digital goods, and more particularly, but not by way of limitation, to managing supplemental content related to a digital good.

BACKGROUND

Digital goods are usurping physical goods in a number of markets, as they offer cheap, near instant delivery and effective inexhaustibility. For example, an eBook may be digital delivery almost instantly to a limitless number of consumers and do not physically degrade over time. However, inexhaustibility may depress market prices for the digital goods since they lack rarity and digital goods may not be a perfect substitute for their physical counterparts in all respects.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the invention. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Example embodiments provide systems and methods for managing supplemental content relating to a digital good. The supplemental content may include a variety of content in a variety of media forms. For example, the content may be digital media including text, images, audio, interactive presentations, and so forth. In a specific example, the digital good may be an eBook and the supplemental content may be an autograph of the author of the eBook (e.g., the autograph may be a read-only image of the author's autograph). In further examples, the digital good may be a music album and the supplemental content autographs by the band members that created the music album, the digital good may be a movie and the supplemental content may be a "making of" documentary associated with the movie, and so on. The supplemental content may employ various content restrictions and ownership limitations that may be independent of any content restrictions and ownership limitations of the digital good associated with the supplemental content.

In an example embodiment, the supplemental content may be received and stored in accompaniment with the digital good (e.g., storing the supplemental content in the same file as the digital good). Content restrictions preventing actions associated with the supplemental content by unauthorized entities may be implemented. For example, an access restriction may be implemented that prevents unauthorized entities from accessing the supplemental content. In a further example, a modification restriction may be implemented that prevents modification of the supplemental content by unauthorized entities (e.g., read-only content). Entities may be authorized, or de-authorized, to perform the actions corresponding to the content restrictions. Ownership criteria associated with ownership rights of the supplemental content may be determined. For example, one ownership criterion may be a limitation on the number of times the supplemental content is transferred between entities (e.g., one time transfer only). Once the ownership criteria have been determined, the supplemental content and the ownership rights corresponding to the supplemental content may be transferred between entities based on the ownership criteria (e.g., if the ownership criteria are satisfied, the transfer may proceed). Similarly, entities may be authorized to perform actions associated with the supplemental content based on the ownership criteria (e.g., if the ownership criteria are satisfied, a particular entity may be authorized to access the supplemental content). The digital good and the ownership rights corresponding to the digital good may be transferred between entities independent of the supplemental content related to the digital good.

In a further embodiment, the digital good and the associated supplemental content may be listed for sale on an online marketplace. While the supply of most digital goods is inexhaustible, the inclusion of the supplemental content that is of a limited supply may introduce rarity to the digital good. A price for the digital good including the supplemental content may be determined based on an analysis of the availability of the supplemental content, the content restrictions corresponding to the supplemental content, the demand for the digital good, the demand for the supplemental content, and so on. In some example embodiments, the price may be determined via an auction for the digital good and the supplemental content.

Figure 1:
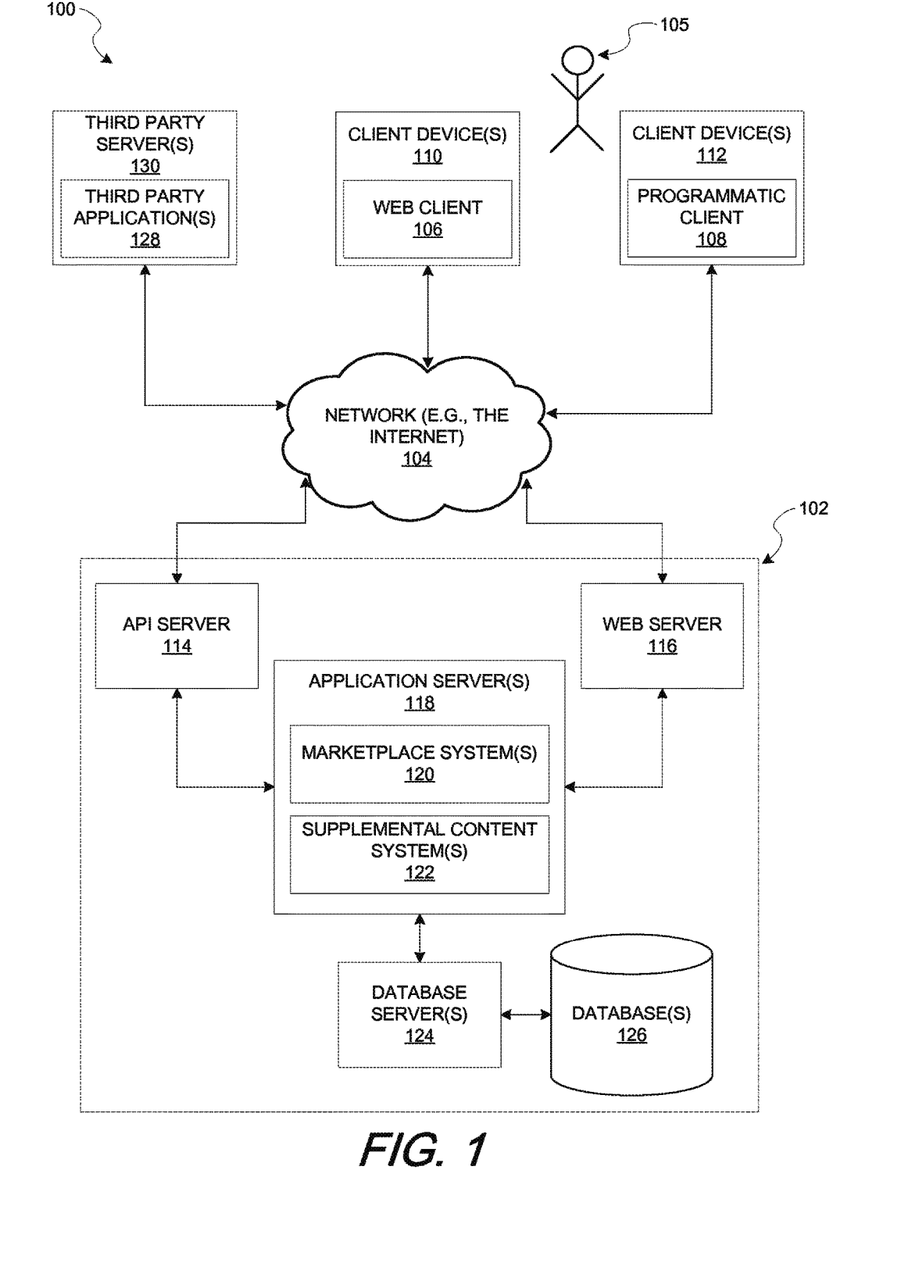
FIG. 1 is a block diagram of a networked system depicting an example embodiment.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110 and 112. FIG. 1 illustrates, for example, a web client 106 (e.g., a browser, such as the Internet Explorer® browser developed by Microsoft® Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, and global positioning system (GPS) device. The client devices 110 and 112 may be a device of a user that is used to perform a transaction involving digital goods within the networked system 102. In one embodiment, the networked system 102 is a network-based marketplace that manages digital goods, publishes publications comprising item listings of products available on the network-based marketplace, and manages payments for these marketplace transactions. One or more users 105 may be a person, a machine, or other means of interacting with client devices 110 and 112. In embodiments, the user 105 is not part of the network architecture 100, but may interact with the network architecture 100 via client devices 110 and 112 or another means.

An application program interface (API) server 114 and a web server 116 are coupled to, and provide programmatic and web interfaces respectively to, one or more application servers 118. The application servers 118 may host one or more marketplace systems 120 and supplemental content system 122, each of which may comprise one or more modules or applications and each of which may be embodied as hardware, software, firmware, or any combination thereof. The application servers 118 are, in turn, shown to be coupled to one or more database servers 124 that facilitate access to one or more information storage repositories or database(s) 126. In an example embodiment, the databases 126 are storage devices that store information to be posted (e.g., publications or listings) to the marketplace system 120. The databases 126 may also store digital goods information in accordance with example embodiments.

The marketplace system(s) 120 may provide a number of marketplace functions and services to users 105 that access the networked system 102. The supplemental content system 122 may likewise provide a number of functions to manage supplemental content related to digital goods. While the marketplace system(s) 120 and supplemental content system(s) 122 are shown in FIG. 1 to both form part of the networked system 102, it will be appreciated that, in alternative embodiments, each system 120 and 122 may form part of a payment service that is separate and distinct from the networked system 102. In some embodiments, the supplemental content system 122 may form part of the marketplace system 120.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various marketplace and supplemental content systems 120 and 122 could also be implemented as standalone software programs, which do not necessarily have networking capabilities.

The web client 106 accesses the various marketplace and supplemental content systems 120 and 122 via the web interface supported by the web server 116. Similarly, the programmatic client 108 accesses the various services and functions provided by the marketplace and supplemental content system 120 and 122 via the programmatic interface provided by the API server 114. The programmatic client 108 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 108 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
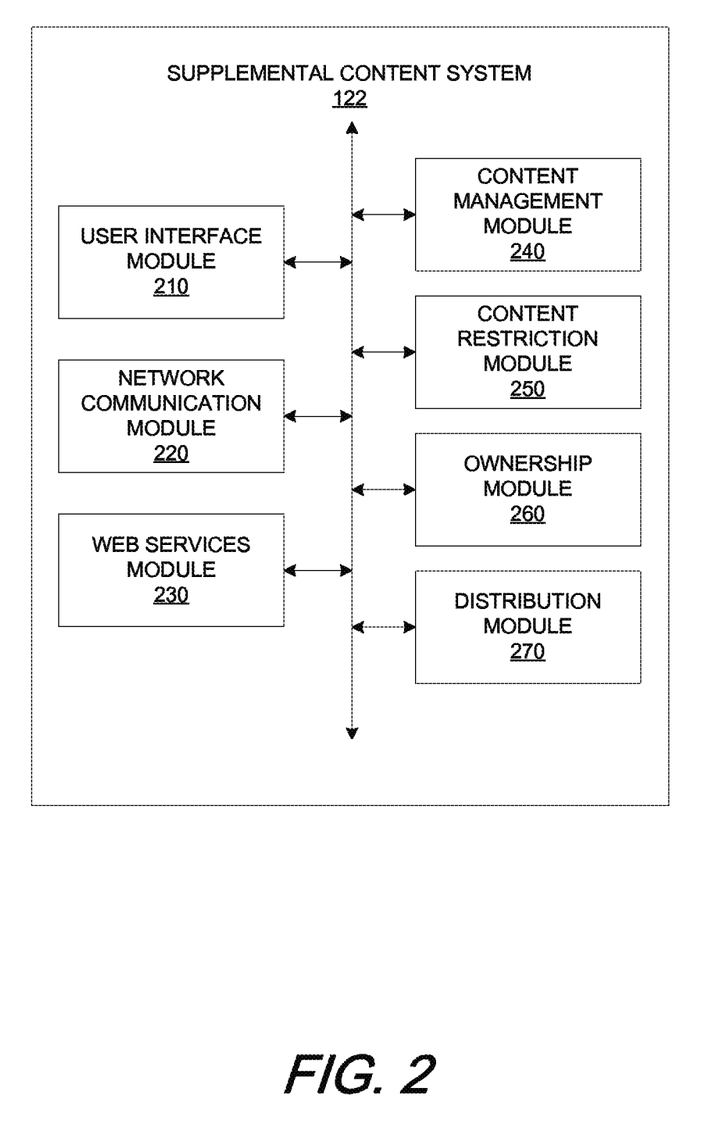
FIG. 2 is a block diagram depicting an example embodiment of a supplemental content system.

FIG. 2 is a block diagram of the supplemental content system 122, which may provide a number of functions to manage supplemental content related to digital goods. In an example embodiment, the supplemental content system 122 may include a user interface module 210, a network communication module 220, a web services module 230, a content management module 240, a content restriction module 250, an ownership module 260, and a distribution module 270. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The user interface module 210 may provide various user interface functionality operable to interactively present and receive information from the user 105. For example, the user interface module 210 may provide a user interface configured to receive a request for the supplemental content related to the digital good. Information may be presented using a variety of means including visually displaying information and using other device outputs (e.g., audio, tactile, and so forth). Similarly, information may be received by a variety of means including alphanumeric input or other device input (e.g., one or more touch screen, camera, tactile sensors, light sensors, infrared sensors, biometric sensors, microphone, gyroscope, accelerometer, other sensors, and so forth). It will be appreciated that the user interface module 210 may provide many other user interfaces to facilitate functionality described herein. Presenting may mean communicating information to a device (e.g., client devices 110 and 112), the device having functionality operable to perform presentation using the communicated information. Interactively presenting may mean the exchange of information from the presenting device, the user 105, and the supplemental content system 122.

The network communication module 220 may perform various network communication functions such as communicating with the client devices 110 and 112 and servers such as the application servers 118, the database servers 124, and the third party servers 130. Network communication may operate over any wired or wireless means to provide communication functionality.

The web services module 230 may perform various web services functions such as retrieving information from third party servers 130 and application servers 118. Information retrieved by the web services module 230 may include data associated with the user 105 (e.g., user profile information from an online account, social networking data associated with the user 105, and so forth), data associated with an item (e.g., images of the item, reviews of the item, and so forth), and other data.

The content management module 240 may perform various functions to facilitate the management of the supplemental content. For example, the content management module 240 may receive the supplemental content, facilitate acquisition of the supplemental content, store the supplemental content, and provide other functionality for managing the supplemental content.

The content restriction module 250 may implement content restrictions preventing actions associated with the supplemental content. The content restrictions may include an access restriction preventing access to the supplemental content by unauthorized entities, a modification restriction preventing modification of the supplemental content, and other content restrictions. The content restriction module 250 may authorize, or de-authorize, entities to perform the actions corresponding to the content restrictions.

The ownership module 260 may determine ownership criteria associated with ownership rights corresponding to the supplemental content. Further actions associated with the supplemental content may be based on the determined ownership criteria. For example, the ownership module 260 may prevent the transferring of the ownership rights corresponding to the supplemental content based, in part, on the determined ownership criteria. Likewise, authorizing access to the supplemental content and other authorizations may be based, in part, on the determined ownership criteria.

The distribution module 270 may facilitate distribution of the supplemental content. For example, the distribution module 270 may cause the distribution of the supplemental content by providing a means to download, stream, access, and so forth, the supplemental content. It will be appreciated that distribution, as used herein, may mean causing distribution.

Figure 3:
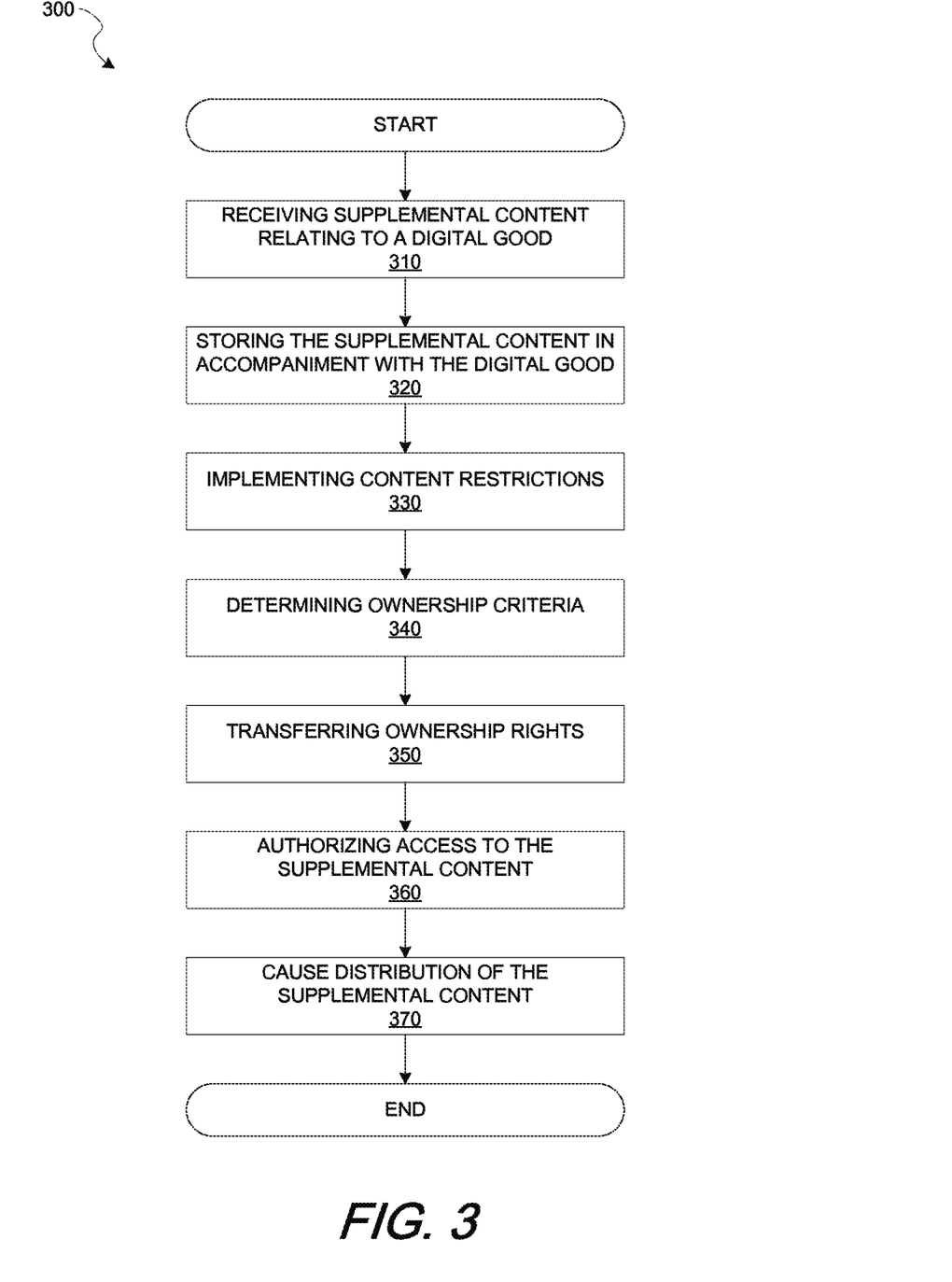
FIG. 3 is a flow diagram illustrating an example embodiment for managing supplemental content related to a digital good.
Figure 4:
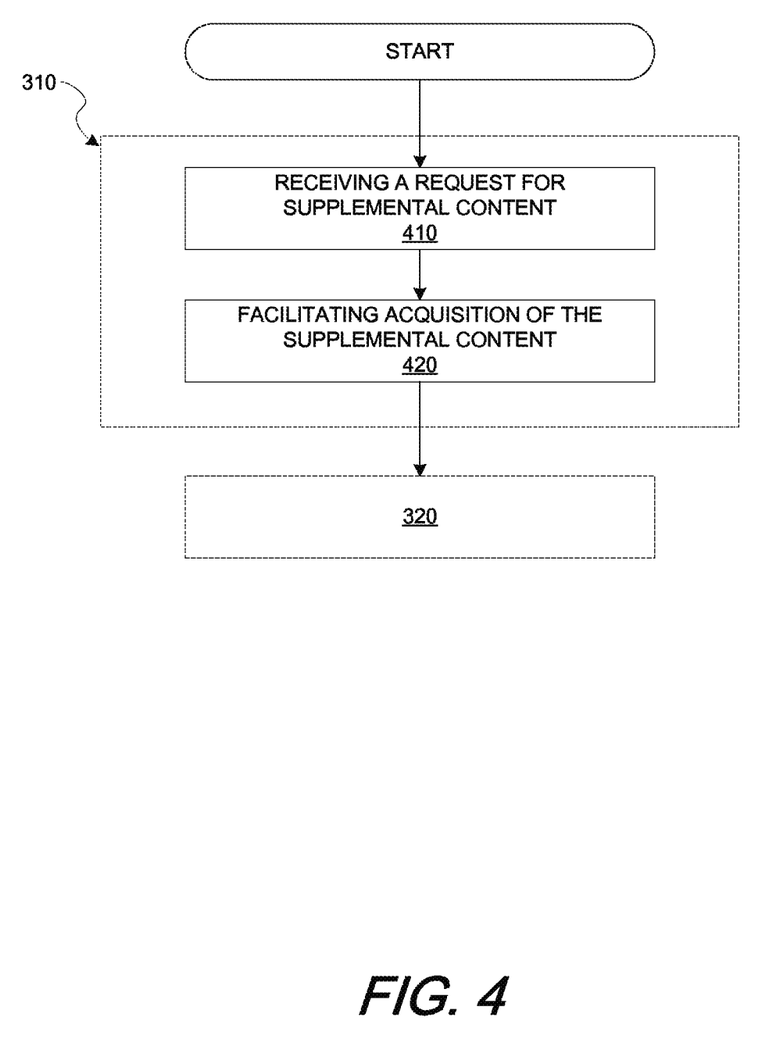
FIG. 4 is a flow diagram illustrating an example embodiment for receiving supplemental content.

FIG. 3 is a flow diagram illustrating an example method 300 for managing the supplemental content relating to the digital good. At operation 310, the supplemental content system 122, using the content management module 240, may receive the supplemental content. In further embodiments, the supplemental content system 122 may receive a request for the supplemental content, facilitate acquisition of the supplemental content, and then receive the supplemental content as depicted in FIG. 4. The supplemental content may be received from a variety of entities. For example, the supplemental content may be received from the author, the publisher, the owner of the digital good, a third party entity, and so forth.

The supplemental content may be related to the digital good. In some example embodiments, the supplemental content may be related to the digital good such that the supplemental content extends or modifies the use of the digital good. In other embodiments, the supplemental good may be related to the digital good such that it enhances the digital good or adds value to the digital good (e.g., an author autograph of an eBook). The supplemental content may be in a variety of forms including digital media and may include a variety of content. In some non-limiting examples, the supplemental content may include digital media such as text, images, video, audio, instructions to modify the digital good, interactive presentations, and so forth. In a specific example, the digital good may be an eBook and the supplemental content may be an autograph of the author of the eBook. In a further example, the supplemental content may include a personalized message from the author of the eBook. In yet another example, the supplemental content may be a personalized video message from the author of an eBook. Many types of content and varieties of media may be included in the supplemental content.

The supplemental content may be a for presentation to the consumer or user 105 of the digital good. In the example where the digital good may be an eBook and the supplemental content may be an author autograph, the autograph may be presented to the user 105, for example, on a display of an eBook reader, tablet device, mobile device, personal computer (PC), any device capable of presenting digital content, and the like. Many other varieties of presentation and devices for presentation may be employed.

In some example embodiments, supplemental content may be received from more than one entity and at different times. In the example where the digital good may be an eBook, an autograph may be received from the author of the eBook. In this example, at a later time, the owner of the eBook may provide additional supplemental content, such as a personalized message. The additional supplemental content may be included with the supplemental content. In another example, where there are multiple authors of an eBook, each author may provide an autograph at different times, and the supplemental content may include each of the authors' autographs.

At operation 320, the supplemental content system 122, using the content management module 240, may store the supplemental content in accompaniment with the digital good. In other words, the supplemental content may be stored in association with the digital good. For example, the supplemental content may be stored in the same file as the digital good or in a separate file that is associated with the digital good. A variety of means to associate the supplemental content with the digital good may be employed (e.g., the supplemental content may contain an identifier that identifies the digital good).

In some example embodiments, the supplemental content may be associated with a single instance of the digital good. In other embodiments, the supplemental content may be associated with more than one instance of the digital good. In the example where the digital good may be an eBook and the supplemental content may be an author autograph, a single autograph of the author may be copied and stored in association with multiple eBooks. In other embodiments, the supplemental content may only be stored in association with a single digital good (e.g., the supplemental content is stored in the same file as the digital good and cannot be stored or associated with another instance of the same digital good or another digital good).

At operation 330, the supplemental content system 122, using the content restriction module 250, may implement content restrictions that prevent actions associated with the supplemental content by unauthorized entities. The content restrictions may include at least one access restriction preventing access to the supplemental content by unauthorized entities. For example, an access restriction may prevent access (e.g., viewing the supplemental content or downloading the supplemental content) by an entity that has not been authorized to access the supplemental content.

The content restrictions may include at least one modification restriction preventing modification of the supplemental content by unauthorized entities. For example, a modification restriction may make the supplemental content read-only to entities that have not been authorized to modify the supplemental content. In an example embodiment, the supplemental content may not be modified by any entity once received and stored in association with the digital good. In other example embodiments, entities that have been authorized to modify the supplemental content may make modifications to the supplemental content such as deleting the supplemental content, adding content to the supplemental content, changing the supplemental content, and so forth. In the specific example where the digital good may be an eBook and the supplemental content may be an author autograph, the autograph may not be modified once received.

In some example embodiments, the content restrictions may be entity-specific. In other words, content restrictions may restrict specified entities. For example, the publisher of the digital good may implement the modification restriction to prevent all other entities from modifying the supplemental content. In a further example, supplemental content provided by the owner may be modified by any subsequent owner of the digital good. Many other entity specific supplemental content modifications schemes may be employed.

In further example embodiments, the content restrictions may be implemented by a variety of entities. For example, the publisher may implement, or cause to be implemented, a particular content restriction and the owner of the supplemental content may implement, or cause to be implemented, a different content restriction.

In still further example embodiments, the content restrictions may include temporal limitations. Many variations of temporal limitations may be employed. For example, the supplemental content may only be modified for a certain time period (e.g., the supplemental content may be modified for a period of ten days starting on the date of the purchase). In another example, the supplemental content may only be accessed for a certain time period (e.g., the supplemental content may be accessed for a period of one year starting on the date of purchase) or the supplemental content may become inaccessible after a certain period of time.

Many other varieties of content restrictions may be implemented that restrict various actions associated with the supplemental content. A few further examples of content restrictions include copy restrictions (e.g., limit copying of the supplemental content), machine use restrictions (e.g., only a certain number of machines may use the supplemental content or only a certain type of machine may use the supplemental content), and so forth.

The content restrictions may be implemented using a variety of schemes and techniques. For example, the content restrictions may be stored in the supplemental content, in the digital good, in a separate file, in a database, in an application server, in a third party server, or elsewhere. The content restrictions may be enforced by a variety of devices. For instance, an application server (e.g., marketplace system 120) may enforce the content restrictions in a scheme where the client device (e.g., client devices 110 and 112) requests permission e.g., access to the supplemental content) from the application server and the application server may grant or deny the permission based on various criteria. In another example, the content restriction may be stored locally on a client device e.g., client devices 110 and 112) in the supplemental content and the client device 110, 112 may determine whether to enforce the restriction based on various criteria. Many other schemes and techniques may be used to implement the content restrictions.

Figure 5:
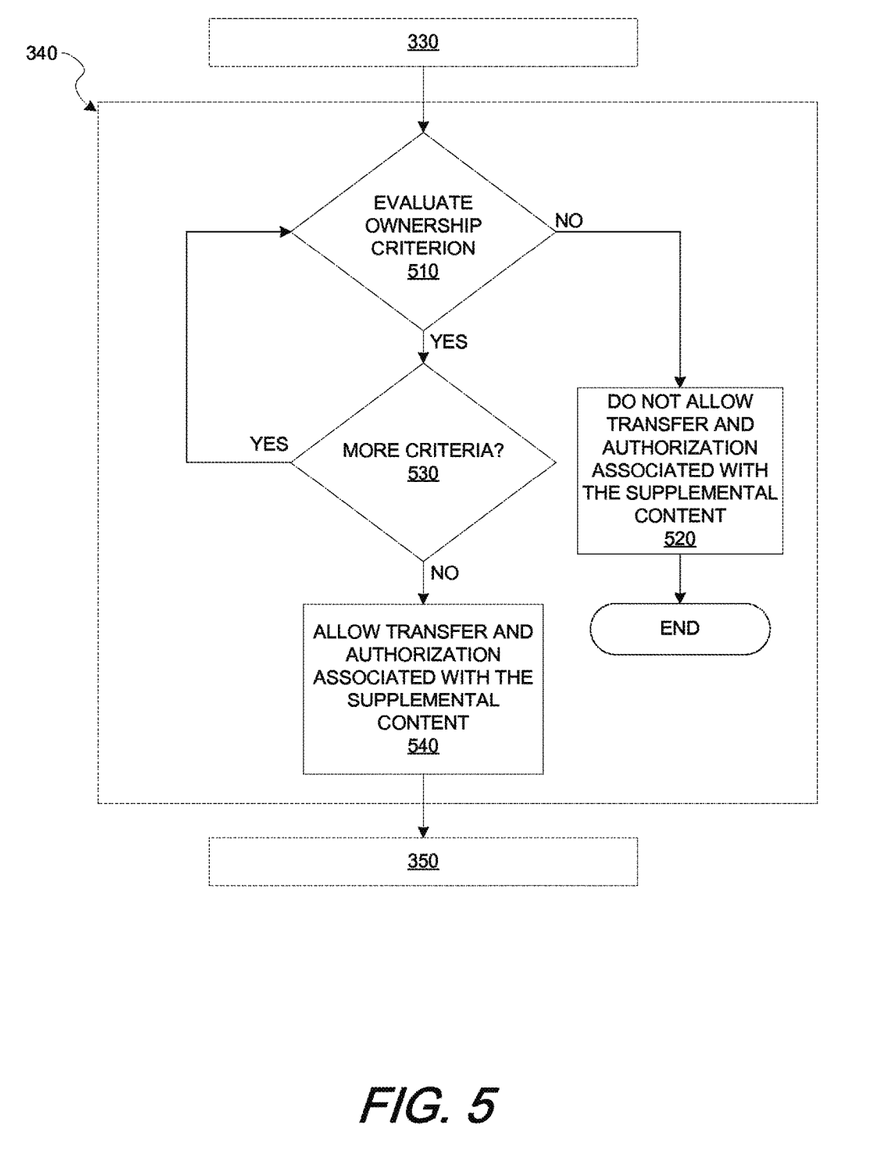
FIG. 5 is a flow diagram illustrating an example embodiment for determining ownership criteria.

At operation 340, the supplemental content system 122, using the ownership module 260, may determine ownership criteria associated with ownership rights of the supplemental content as further depicted in FIG. 5. The determination of the ownership criteria may be used when transferring the ownership rights corresponding to the supplemental content between entities and when authorizing entities to use the supplemental content or perform various actions associated with the supplemental content (e.g., to deactivate various restriction actions associated with the supplemental content). For example, satisfying the ownership criteria may allow for the ownership rights corresponding to the supplemental content to be transferred from a first entity to a second entity and further may authorize the second entity to access the supplemental content.

At operation 350, the supplemental content system 122, using the ownership module 260, may transfer the ownership rights corresponding to the supplemental content from the first entity to the second entity. For instance, the first entity (e.g., the online marketplace system 120 or another entity) may own the rights to the supplemental content and may sell the rights to the supplemental content to the second entity (e.g., the user 105, a consumer, or another entity). In sonic example embodiments, the transferring of the ownership rights corresponding to the supplemental content may be based, at least in part, on the determined ownership criteria. For instance, if the ownership criteria are not satisfied, the ownership rights corresponding to the supplemental content may not be transferred to the second entity. In further embodiments, the ownership rights corresponding to the supplemental content may be modified based on the determined ownership criteria. (e.g., a one-time transfer limitation will be exhausted after a transfer).

The transferring of the ownership rights corresponding to the supplemental content may be independent of transferring the digital good and the ownership rights corresponding to the digital good. For example, the ownership rights corresponding to the supplemental content may be transferred before, after, or with the digital good. In a specific example embodiment, the supplemental content is requested after transferring the digital good. For example, the consumer or other entity may purchase the digital good and subsequent to the purchase of the digital good, may be offered the supplemental content related to the digital good (e.g., an &Book with the option to receive an author autograph after purchase). In other embodiments, the supplemental content may be part of the digital good and the ownership rights corresponding to the supplemental content and the digital good may be transferred together in the same transaction.

In some example embodiments, the supplemental content may be of finite supply. The supplemental content system 122, using the ownership module 260, may maintain a finite supply of the supplemental content. The finite supply of the supplemental content may be maintained at various operations associated with the supplemental content. The finite supply of supplemental content may be a fixed number of instances of the supplemental content. In an example embodiment, the transferring of the supplemental content may include maintaining the finite supply. For example, simply copying the supplemental content may increase the supply. Duplicative instances of the supplemental supply may be inhibited using various schemes and techniques to maintain the finite supply of the supplemental content. In an example embodiment, the finite supply may be maintained by deleting the duplicative instances of the supplemental content (e.g., communicate the supplemental content from a first device to a second device and deleting the supplemental content stored in the first device). In another example embodiment, the finite supply may be maintained by controlling access to the supplemental content (e.g., the duplicative instances of the supplemental content may exist, but access may only be provided to some of the instances of the supplemental content to maintain the finite supply). Access to the supplemental content may be controlled using various techniques including encryption and decryption schemes. Other digital rights management techniques may be implemented to maintain a finite supply of the supplemental content. Many other schemes and techniques may be implemented to maintain the finite supply of the supplemental content.

At operation 360, the supplemental content system 122, using the content restriction module 250, may authorize a particular entity to access to the supplemental content. For example, subsequent to the ownership rights corresponding to the supplemental content having been transferred from the first entity to the second entity at operation 350, the second entity may be authorized to access the supplemental content at operation 360. In other example embodiments, the second entity may be authorized to access the supplemental content prior to, at the same time as, or subsequent to the transfer of the ownership rights corresponding to the supplemental content. In some example embodiments, the authorizing of the second entity to access the supplemental content may be based, at least in part, on the determined ownership criteria. For instance, if the ownership criteria are not satisfied, the second entity may not be authorized to access the supplemental content.

At operation 370, the supplemental content system 122, using the distribution module 270, may cause the distribution of the supplemental content. The distribution of the supplemental content may be performed via a number of different means. For example, the distribution may be a digital download of the supplemental content, a streaming of the digital content, a transferring of the supplemental content from one device to another device (e.g., peer-to-peer network, wired communication, or near field communication (NYC) data transfer), and so on. In a specific example embodiment, the supplemental content may be included with the digital good and the distribution may simply be to facilitate access to the supplemental content already included in the digital good (e.g., cause to make available the supplemental content already included in the digital good). Many different means for distribution of the supplemental content may be employed.

FIG. 4 is a flow diagram illustrating an example embodiment of operation 310 for receiving supplemental content. At operation 410, the supplemental content system 122, using the content management module 240, may receive a request for supplemental content. For example, the owner of the eBook may, after purchasing the eBook, request a personalized inscription and autograph by the author of the &Book. The request for the supplemental content may include a specification of the supplemental content. For example, the consumer, or other entity, may provide a name or an occasion as the basis for the personalized inscription to the eBook. Many other varieties of the specification of the supplemental content may be included with the request for supplemental content.

At operation 420, the supplemental content system 122, using the content management module 240, may facilitate acquisition of the supplemental content. For instance, the supplemental content may be requested from a third party or a third party server, the supplemental content may simply be stored in a storage device such as database 126 and accessed directly, and so on. In the example where the digital good may be an eBook and the supplemental content may be an autograph of the author of the eBook, the supplemental content system 122 may forward the request for the autograph along with any personalization specifications to the author and, subsequent to the author providing the autograph and personalization, the supplemental content system 122 may receive the supplemental content. Many other schemes and techniques may be employed to facilitate the acquisition of the supplemental content.

FIG. 5 is a flow diagram illustrating an example embodiment for operation 340 for determining ownership criteria. The ownership criteria may include one or more ownership criterion associated with the ownership rights of the supplemental content. In an example embodiment, at operation 510, the supplemental content system 122, using the ownership module 260, may evaluate each, or some, of the one or more ownership criteria (e.g., determine whether the ownership criterion is satisfied). The evaluation of the ownership criteria may be used to perform or prevent actions associated with the supplemental content.

In an example embodiment, at operation 520, the supplemental content system 122, using the ownership module 260, may not allow the transfer of the ownership rights corresponding to the supplemental content and the authorizing of access to the supplemental content if, for example, the ownership criterion is not satisfied at operation 510. For instance, if the ownership criteria include a particular ownership criterion that has not been satisfied, then actions associated with the supplemental content may be prevented.

At operation 530, the supplemental content system 122, using the ownership module 260, may determine whether there are more ownership criteria included in the ownership criteria to evaluate at operation 510. In some example embodiments, each ownership criterion included in the ownership criteria may be evaluated at operation 510. In other embodiments, only some ownership criteria included in the ownership criteria may be evaluated at operation 510.

At operation 540, the supplemental content system 122, using the ownership module 260, may allow the transfer of ownership rights corresponding to the supplemental content and the authorization of access to the supplemental content. For instance, if the ownership criteria are satisfied at operation 510, then the ownership rights corresponding to the supplemental content may be transferred at operation 350 and authorizing access to the supplemental content may be performed at operation 360. In further embodiments, the distribution of the supplemental content may, likewise, be dependent upon satisfying the ownership criteria.

Many different types of ownership criteria may be included in the ownership criterion. In an example embodiment, the ownership criteria may include a transfer limitation criterion that limits the number of transfers of the supplemental content to a predefined number of transfers (e.g., one-time-only transfer). For example, the transfer limitation criterion may limit the number of transfers of the supplemental content to three transfers. Each transfer of the supplemental content may update ownership rights information corresponding to the supplemental content. The ownership rights information may be embedded in the supplemental content, stored on a server (e.g., online marketplace system 120), stored locally on a device (e.g., client device 110 and 112), and so forth. In some example embodiments, the ownership rights information may be managed by marketplace system 120. In a further example embodiment, the ownership rights information may be presented to an entity (e.g., the ownership rights information may be presented along with details about the supplemental content on an online marketplace, for example). In a specific example, the ownership rights information may include a transfer count, and each transfer of the supplemental content may decrement the transfer count until the number of transfers has been exhausted. Once the transfer count is exhausted, a transfer content restriction may be implemented to prevent further transfers of the supplemental content.

In another example, the ownership criteria may include a time limitation criterion that limits the time the supplemental content may be accessed. For example, supplemental content may be accessible for only one year starting on the purchase date. In this example, the ownership rights information may track the time elapsed since the purchase date and, upon exhausting the time allotted, the access restriction may be implemented to prevent access to the supplemental content (e.g., by de-authorizing an entity from accessing the supplemental content). In a further example embodiment, the time limitation criterion may transfer with the supplemental content (e.g., transfers to subsequent entities may only be entitled to the remainder of the allotted time). Many other schemes may be employed for the time limitation criterion.

Figure 6:
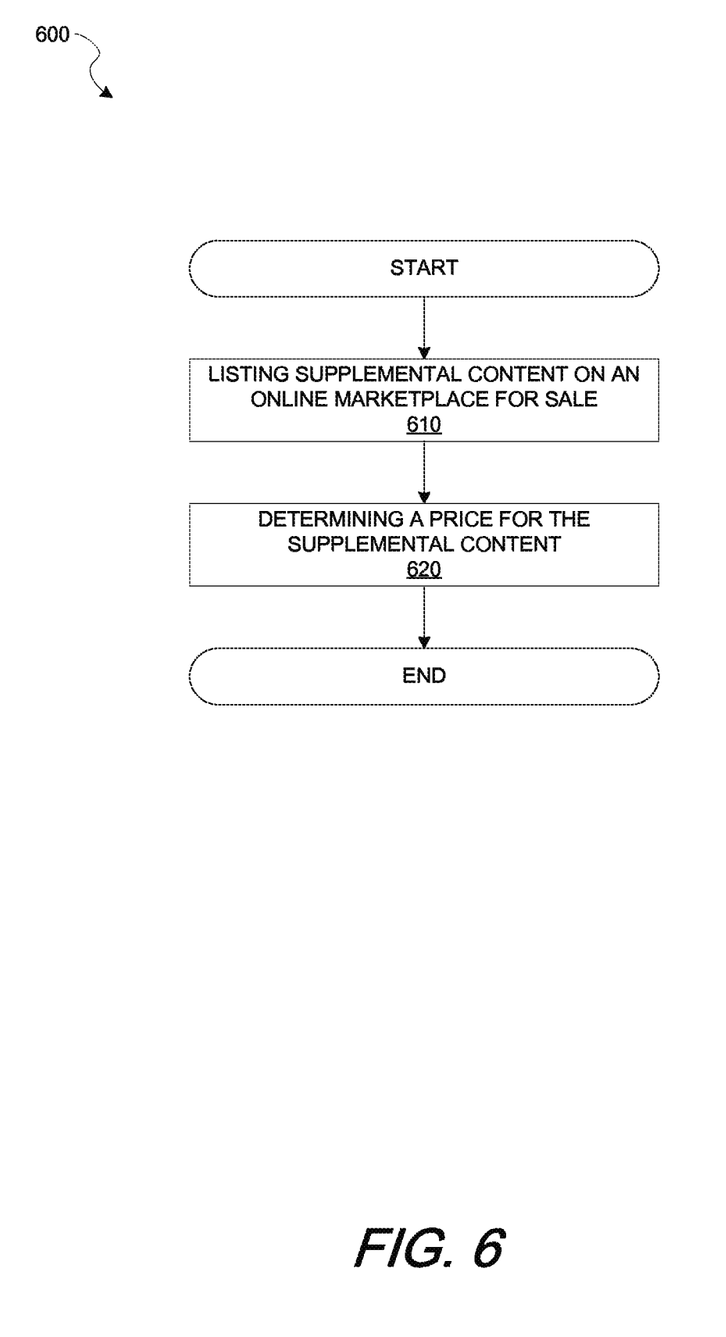
FIG. 6 is a flow diagram illustrating an example embodiment for listing supplemental content to an online marketplace.

FIG. 6 is a flow diagram illustrating an example method 600 for listing the supplemental content to an online marketplace (e.g., marketplace system(s) 120). At operation 610, the supplemental content system 122, using the content management module 240, may list the supplemental content to an online marketplace for sale. The supplemental content may be listed for sale before or after determining a price for the supplemental content. In some embodiments, the supplemental content may be listed for sale prior to receiving the supplement content. For instance, where the digital good may be an eBook and the supplemental content may be a personalized inscription from the author of the &Book, the supplemental content may be listed for sale, and subsequent to the sale, the supplemental content personalized to the buyer received.

At operation 620, the supplemental content system 122, using the content management module 240, may determine a price for the supplemental content. The price may be fixed, dynamically determined, determined by auction, and an forth. In an example embodiment, the price for the supplemental content may be determined based on an analysis of the availability of the supplemental content, the content restrictions corresponding to the supplemental content, the demand for the digital good, the demand for the supplemental content, and so on. Many other factors may also be used to determine the price of the supplemental content, such as a previous sale price for the same or similar supplemental content, popularity of the publisher of the supplemental content, popularity of the digital good related to the supplemental content, and so forth.

In some example embodiments, the price of the supplemental content may be specific to the entity buying the supplemental content. For example, if it is determined that the buyer may be highly interested in the supplemental content, the price for that particular entity may be higher than for other entities. In a specific example, if the digital good is an eBook and the supplemental content is a personalized inscription of the eBook by the author, the price for buying the personalized inscription may be higher for an entity (e.g., a consumer) that, for example, has purchased other books by the same author, has purchased other supplemental content similar to the supplemental content, and so forth. Information relating to the entity, such as purchase history, may be retrieved from, for example, marketplace system 120, third party servers 130, and so forth. Other means of determining the consumer's interest in the supplemental content may be employed, such as an analysis of social media posts associated with the consumer or associates of the consumer (e.g., a keyword hit count in social postings for terms correlated to the supplemental content), online reviews posted by the consumer, demographic information corresponding to the consumers (e.g., retrieved from marketplace system 120, third party servers 130, and so on), and so forth.

The content restrictions corresponding to the supplemental content may be used to determine a price for the supplemental content. For example, if the supplemental content corresponds to a content restriction that limits the number of transfers that may be made, the supplemental content with the content restriction may be priced lower than the same or similar supplemental content that does not have any content restrictions.

In an example embodiment, the availability of the supplemental content may be a factor when determining the price for the supplemental content. Since the supplemental content may implement content restrictions that restrict access, modification, copying, and the like, the supply of the supplemental content may be finite. The available supply for the supplemental content may be retrieved, for example, from the marketplace system 120, third party servers 130, and so forth. The supply of the supplemental content may be incorporated into supply and demand models for the supplemental content to determine a price for the supplemental content. For a simple example, a reduction in supply of the supplemental content at a given demand may produce an increase in the market price for the supplemental content. For instance, maintaining a finite, non-infinite, supply of the supplemental content may increase the market price for the supplemental content since the supply of the supplemental content is limited.

The demand for the supplemental content may be determined in a number of different ways. In some example embodiments, proxies for the demand for the supplemental content may be used, such as demand tier the digital good the supplemental content is related to, demand for similar supplemental content, demand for similar digital goods, and so forth. Demand may be determined in other ways, such as determining web page hits for the supplemental content, the digital good, similar supplemental content and digital goods, and so on. Like the supply, the demand may be incorporated into supply and demand models for the supplemental content to determine a price for the supplemental content.

In further embodiments, the price for the supplemental content may be determined, in part, by arrangements with various entities associated with the supplemental content (e.g., publisher, distributor, and the like). For example, if the digital good is an eBook and the supplemental content is an autograph of the author of the &Book, the publisher of the eBook may have arranged to take a percentage of the proceeds, for example, from the sale of the supplemental content and may have the authority to set the price of the supplemental content. In other embodiments, the distributor of the supplemental content may, likewise, have arranged to take a percentage of the proceeds, for example, from the sale of the supplemental content. Many other possible arrangements with entities associated with the supplemental content may be employed that may, in part, determine the price of the supplemental content and allocation of the proceeds from the sale of the supplemental content.

Figure 7:
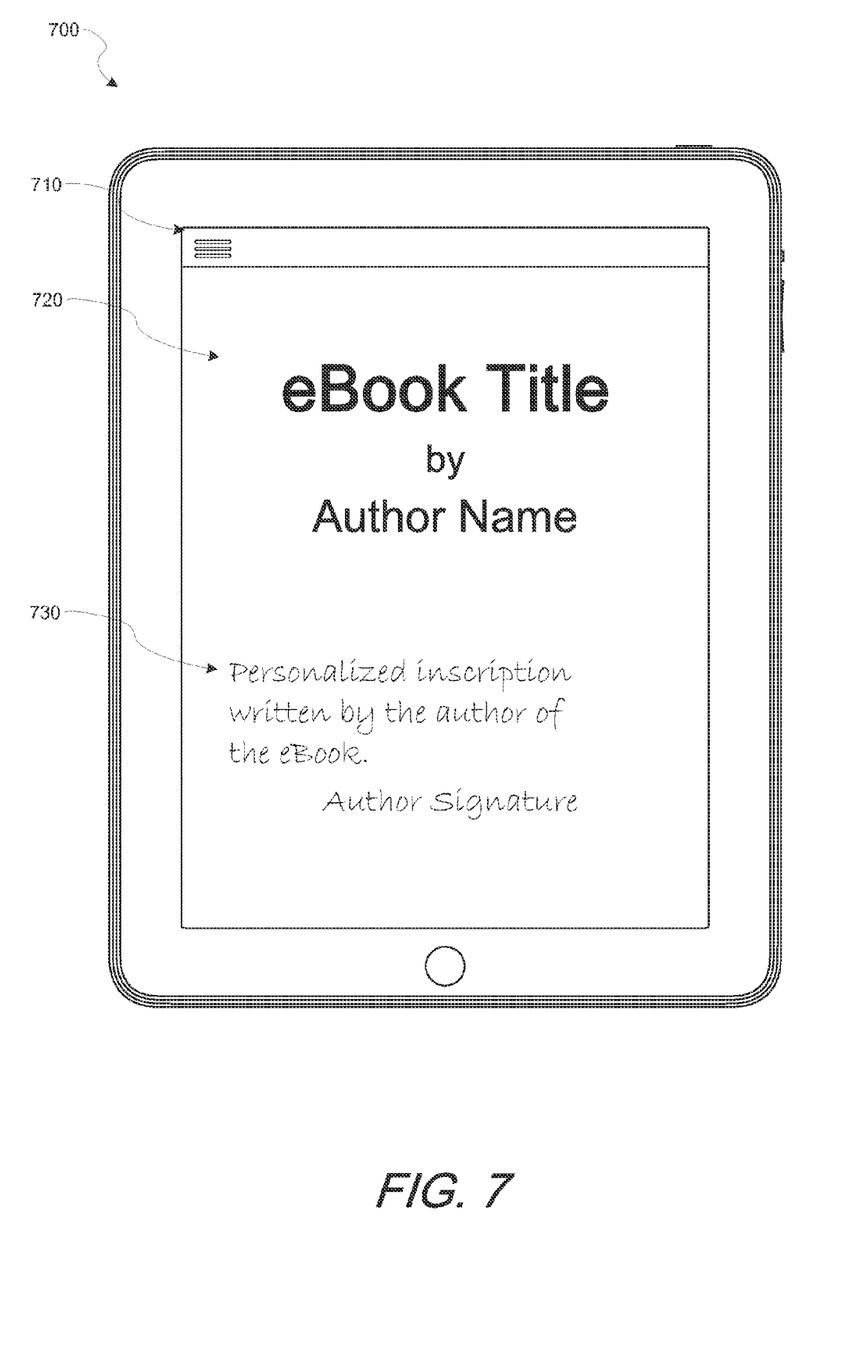
FIG. 7 depicts an example embodiment of supplemental content related to a digital good.

FIG. 7 depicts an example embodiment of a presentation device 700 (e.g., eBook reader, tablet computer, smartphone) operable to present the digital good and the supplemental content. The presentation device 700 may include a display 710, although the digital good and the supplemental content may be of a media for that requires no display 710 (e.g., audio). The presentation device 700 may display a digital good 720. In this example, the digital good 720 may be an eBook. FIG. 7 depicts the title page of eBook digital good 720, although the supplemental content does not need to be included in the title page or any part of the digital good 720.

Personalized inscription 730 may be an example embodiment of the supplemental content related to a digital good 720. In this instance, the personalized inscription 730 may be related to the digital good 720 by being written and autographed by the author of an eBook such as the digital good 720, although another relationship between the supplemental content and the digital good 720 may be employed. In this example embodiment, the example supplemental content is part of the digital good 720, although the supplemental content need not be part of the digital good 720.

Modules, Components, and Logic

Figure 8:
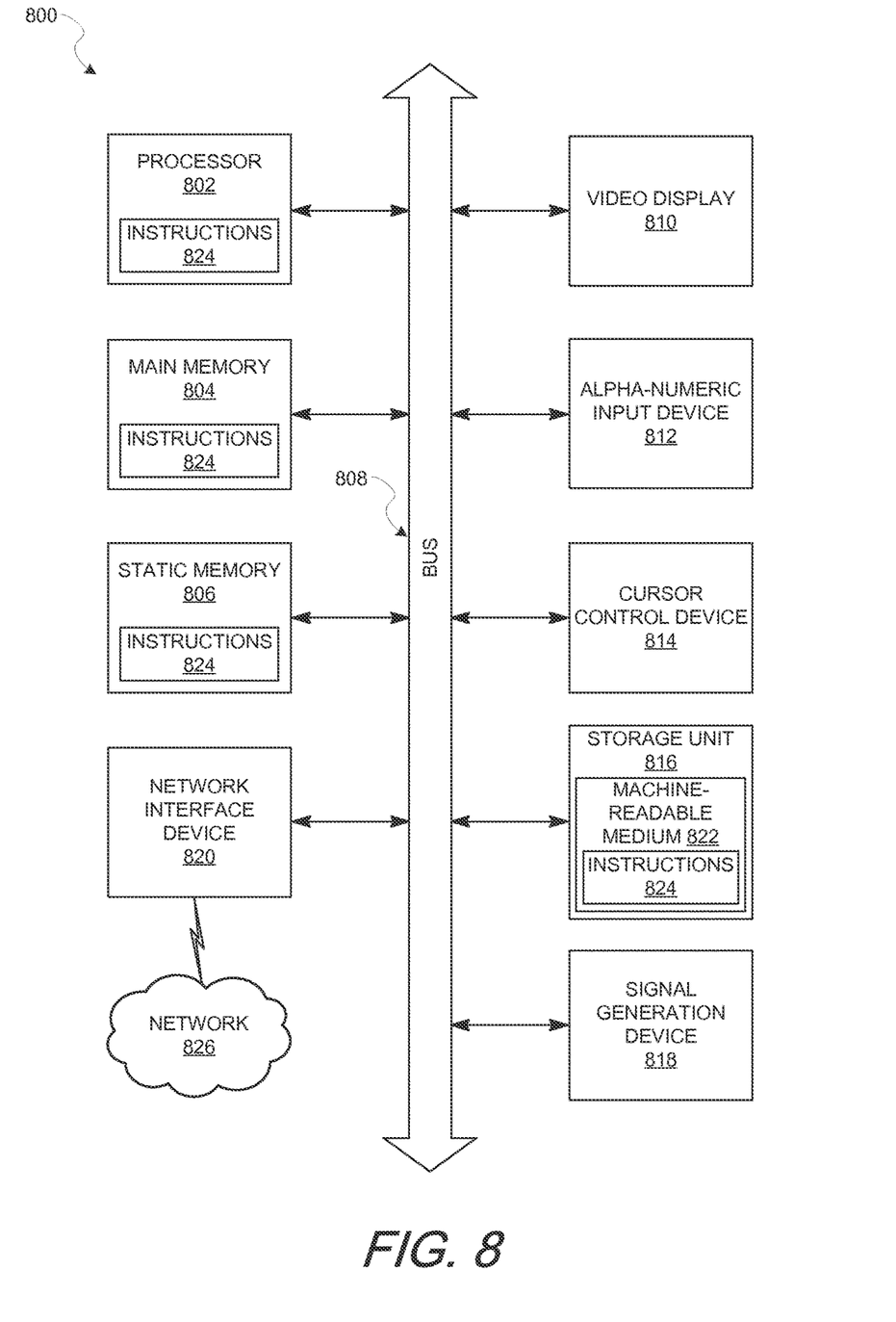
FIG. 8 is an example embodiment of a computer system in conjunction with the present inventive subject matter.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software, a program, an application, an applet, an app, or other executable code) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine 800 is illustrated, the term "machine" shall also be taken to include a collection of machines 800 that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (REIC), or any suitable combination thereof), a main memory 804, and a static memory 806, which are configured to communicate with each other via a bus 808. The machine 800 may further include a video display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 embodying any one or more of the methodologies or functions described herein. The instructions 824 may also reside, completely or at least partially, within the main memory 804, within the static memory 806, within the processor 802 (e.g., within the processor's cache memory), or both, during execution thereof by the machine 800. Accordingly, the main memory 804, static memory 806 and the processor 802 may be considered as machine-readable media 822. The instructions 824 may be transmitted or received over a network 826 via the network interface device 820.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing instructions (e.g., instruction 824) for execution by a machine (e.g., machine 800), such that the instructions, when executed by one or more processors of the machine 800 (e.g., processor 804 cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 822 is non-transitory in that it does not embody a propagating signal. However, labeling the machine-readable medium 822 as "non-transitory" should not be construed to mean that the medium is incapable of movement the medium should be considered as being transportable from one physical location to another. Additionally, since the machine-readable medium 822 is tangible, the medium may be considered to be a machine-readable device.

The instructions 824 may further be transmitted or received over a communications network 826 using a transmission medium via the network interface device 820 and utilizing any one of a number of well-known transfer protocols (e.g., hypertext transfer protocol (HTTP)). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 822 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 802, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. Ill embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions described herein. As used herein, "processor-implemented module" refers to a hardware module implemented using one or more processors 802.

Similarly, the methods described herein may be at least partially processor-implemented, a processor 802 being an example of hardware. For example, at least some of the operations of a method may be performed by one or more processors 802 or processor-implemented modules. Moreover, the one or more processors 802 may also operate to support performance of the relevant operations in a "cloud computing" environment or as a "software as a service" (SaaS). For example, at least some of the operations may be performed by a group of computers (as examples of machines 800 including processors 802), with these operations being accessible via a network 826 (e.g., the Internet) and via one or more appropriate interfaces (e.g., an application program interface (API)).

The performance of certain of the operations may be distributed among the one or more processors 802, not only residing within a single machine 800, but deployed across a number of machines 800. In some example embodiments, the one or more processors 802 or processor-implemented modules may be located in a single geographic location (e.g., within a home environment, an office environment, or a server farm). In other example embodiments, the one or more processors 802 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient tail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer system, comprising:
at least one processor:
at least one memory device holding an instruction set executable: on the processor to cause the computer system to perform operations comprising:
receiving supplemental content to be added to a digital good, the supplemental content being for presentation at a respective remote computing device that corresponds with a marketplace account of a given consumer in an online marketplace;
storing the supplemental content at one or more memory locations with an identifier that identifies the digital good;
determining ownership criteria associated with an ownership right that corresponds to the supplemental content, the ownership right defining a maximum number of transfers of the supplemental content from all owners of the supplemental content;
determining an interest level of a marketplace account of a particular consumer that corresponds with a particular remote computing device based on respective social posts satisfying a keyword hitcount, the particular remote computing device comprising a stored instance of the digital good, wherein each of the respective social posts originate from one of: the marketplace account of the particular consumer and at least one social network account having a social network connection with the particular consumer, wherein each keyword from the respective social posts applied towards the keyword hitcount comprises pre-defined keyword content correlated with the supplemental content;
generating a price for the supplemental content in the online marketplace based at least on the interest level of the marketplace account of the particular consumer;
receiving a request from the particular remote computing device that corresponds with the marketplace account of the particular consumer to purchase, via the online marketplace, the supplement content at the price, the request for the supplemental content including a specification of the supplemental content;
determining a total number of transfers of the supplemental content is below the maximum number of transfers of the supplemental good defined by the ownership right;
modifying an instance of the supplemental content according to a modification restriction to prevent unauthorized modification of the instance of the supplemental content at the particular remote computing device;
updating the ownership tight that corresponds to the supplemental content to represent a. transfer from the online marketplace to the particular remote computing device that corresponds with the marketplace account of the particular consumer; and
causing distribution over a wireless communication channel of the instance of the supplemental content and the ownership right from the online marketplace to the particular remote computing device that corresponds with the marketplace account of the particular consumer.

2. The computer system of claim 1, wherein the digital good comprises an eBook and the supplemental content comprises an author autograph associated with the eBook.

3. The computer system of claim 1, wherein the specification of the supplemental content includes information to personalize the supplemental content to the particular consumer.

4. A method, comprising:
receiving supplemental content to be added to a digital good, the supplerrrental content being for presentation at a respective remote computing device that corresponds with a marketplace account of a given consumer in an online marketplace;
storing the supplemental content at one or more memory locations with an identifier that identifies the digital good;
determining ownership criteria associated with an ownership right that corresponds to the supplemental content, the ownership right defining a maximum number of transfers of the supplemental content from all owners of the supplemental content;
determining an interest level of a marketplace account of a particular consumer that corresponds with a particular remote computing device based on respective social posts satisfying a keyword hitcount, the particular remote computing device comprising a stored instance of the digital good, wherein each of the respective social posts originate from one of: the marketplace account of the particular consumer and at least one social network account having a social network connection with the particular consumer, wherein each keyword from the respective social posts applied towards the keyword hitcount comprises pre-defined keyword content correlated with the supplemental content;
generating a price for the supplemental content in the online marketplace based at least on the interest level of the marketplace account of the particular consumer;
receiving a request from the particular remote computing device that corresponds with the marketplace account of the particular consumer to purchase, via the online marketplace, the supplement content at the price, the request for the supplemental content including a specification of the supplemental content;
determining a total number of transfers of the supplemental content is below the maximum number of transfers of the supplemental good defined by the ownership right;
modifying an instance of the supplemental content according to a modification restriction to prevent unauthorized modification of the instance of the supplemental content at the particular remote computing device:
updating , the ownership right that corresponds to the supplemental content to represent a transfer from the online marketplace to the particular remote computing device that corresponds with the marketplace account of the particular consumer; and causing distribution over a wireless communication channel of the instance of the supplemental content and the ownership right from the online marketplace to the particular remote computing device that corresponds with the marketplace account of the particular consumer.

5. The method of claim 4, wherein the digital good comprises an eBook and the supplemental content comprises an author autograph associated with the eBook.

6. The method of claim 4, wherein the specification of the supplemental content includes information to personalize the instance of the supplemental content to the particular consumer .

7. The method of claim 4, wherein the maximum number of transfers limits the number of transfers to a single transfer.

8. The method of claim 4, wherein the ownership criteria includes a additional ownership right comprising a time limitation criterion that limits the time the supplemental content may be accessed.

9. The method of claim 4, wherein the supplemental content and the ownership right corresponding to the supplemental content are transferred to the particular remote computing device that corresponds with the marketplace account of the particular consumer after the ownership rights corresponding to the digital good are transferred to the particular remote computing device and the digital good is distributed to the particular remote computing device.

10. The method of claim 4, further comprising:
de-authorizing any type of account of the online marketplace from accessing the supplemental content.

11. The method of claim 4, further comprising:
maintaining a finite supply of the supplemental content by inhibiting duplicative instances of the supplemental content.

12. A non-transitory machine readable medium storing executable instructions thereon, which, when executed by a processor, cause the processor to perform operations including:
receiving supplemental content to be added to a digital good, the supplemental content being for presentation at a respective remote computing device that corresponds with a marketplace account of a given consumer in an online marketplace;
storing the supplemental content at one or more memory locations with an identifier that identifies the digital good;
determining ownership criteria associated with an ownership right that corresponds to the supplemental content, the ownership right defining a maximum number of transfers of the supplemental content from all owners of the supplemental content;
determining an interest level of a marketplace account of a particular consumer that corresponds with a particular remote computing device based on respective social posts satisfying a keyword hitcount, the particular remote computing device comprising a stored instance of the digital good, wherein each of the respective social posts originate from one of: the marketplace account of the particular consumer and at least one social network account having a social network connection with the particular consumer, wherein each keyword from the respective social posts applied towards the keyword hitcount comprises pre-defined keyword content correlated with the supplemental content;
generating a price for the supplemental content in the online marketplace based at least on the interest level of the marketplace account of the particular consumer;
receiving a request from the particular remote computing device that corresponds with the marketplace account of the particular consumer to purchase, via the online marketplace, the supplement content at the price, the request for the supplemental content including a specification of the supplemental content;
determining a total number of transfers of the supplemental content is below the maximum number of transfers of the supplemental good defined by the ownership right;
modifying an instance of the supplemental content according to a modification restriction to prevent unauthorized modification of the instance of the supplemental content at the particular remote computing device;
updating , the ownership right that corresponds to the supplemental content to represent a transfer from the online marketplace to the particular remote computing device that corresponds with the marketplace account of the particular consumer; and
causing distribution over a wireless communication channel of the instance of the supplemental content and the ownership right from the online marketplace to the particular remote computing device that corresponds with the marketplace account of the particular consumer.

* * * * *

UNITED STATES PATENT AND TRADEMARK OFFICE
CERTIFICATE OF CORRECTION

PATENT NO. : 9,767,260 B2  
APPLICATION NO. : 14/182232  
DATED : September 19, 2017  
INVENTOR(S) : Neelakantan Sundaresan Page 1 of 1

It is certified that error appears in the above-identified patent and that said Letters Patent is hereby corrected as shown below:

In the Claims

Column 17, Line 20, Claim 1, delete "executable:" and insert -- executable --, therefor.

Column 17, Line 66, Claim 1, delete "updating" and insert -- updating, --, therefor.

Column 17, Line 66, Claim 1, delete "tight" and insert -- right --, therefor.

Column 17, Line 67, Claim 1, delete "a." and insert -- a --, therefor.

Column 18, Line 20, Claim 4, delete "supplerrrental" and insert -- supplemental --, therefor.

Column 18, Line 62, Claim 4, delete "device:" and insert -- device; --, therefor.

Column 18, Line 63, Claim 4, delete "updating ," and insert -- updating, --, therefor.

Column 19, Line 13, Claim 6, delete "consumer ." and insert -- consumer. --, therefor.

Column 20, Line 37, Claim 12, delete "updating ," and insert -- updating, --, therefor.

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*